April 23, 1957 P. R. GOUDY 2,789,433
PITOT TUBE ANEMOMETER
Original Filed Sept. 1, 1949
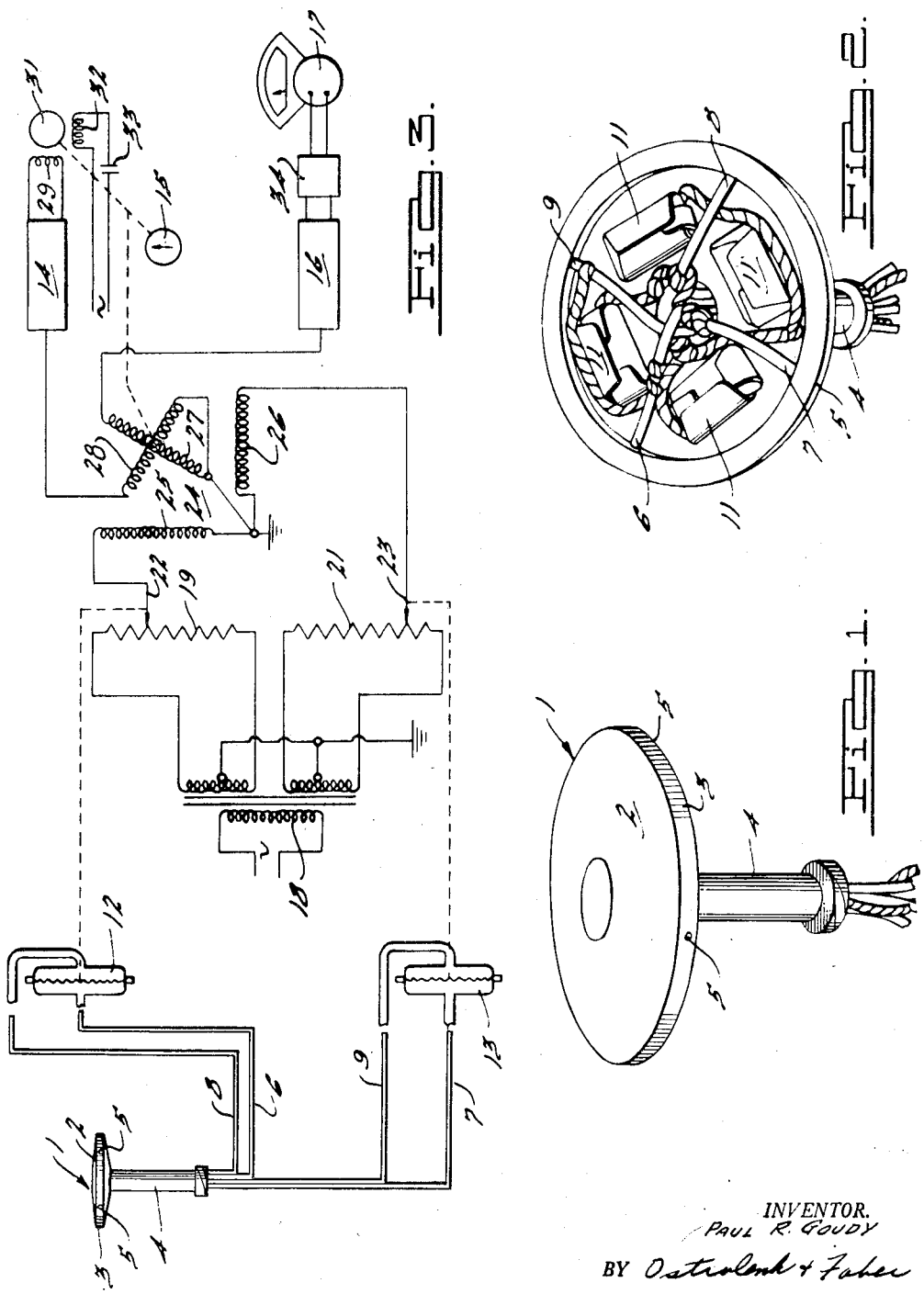
INVENTOR.
PAUL R. GOUDY
BY Ostrolenk + Faber
ATTORNEYS

2,789,433

PITOT TUBE ANEMOMETER

Paul R. Goudy, Whitefish Bay, Wis., assignor to Kollsman Instrument Corporation, a corporation of New York Original application September 1, 1949, Serial No. 113,523, now Patent No. 2,701,474, dated February 8, 1955. Divided and this application June 17, 1953, Serial No. 362,190

2 Claims. (Cl. 73—212)

This application is a division of my application Serial No. 113,523, filed September 1, 1949, which issued on February 8, 1955, as Patent No. 2,701,474, and relates to a device for measuring wind speed and direction, more specifically of a multiple pressure tube arrangement for the measurement of wind direction and velocity in which there are no moving parts exposed to the ambient weather conditions.

Wind speed and direction indicating equipments which are presently in use for providing indications of winds variable in both direction and velocity require the use of moving parts and present a problem of de-icing these moving parts in order to give accurate measurements. The multiple pressure tube anemometer of the present invention is devised to eliminate these de-icing problems by eliminating the moving parts while indicating direction and velocity with substantial accuracy.

The object of the invention is to provide a device for measuring wind speed and direction which involves no moving parts exposed to ambient weather conditions.

Another object of the invention is to provide a device whereby wind velocity and direction may be determined by the impact pressure of the wind against a plurality of pressure orifices in a Pitot head.

Further objects and features of the invention will be readily apparent to those skilled in the art from the specification and appended drawing illustrating certain preferred embodiments in which:

Figure 1 is a perspective view of the Pitot head of the present invention.

Figure 2 is a perspective view of the Pitot head of the present invention with the cover plate removed.

Figure 3 is a schematic showing of the mechanical and electrical mechanisms of the present invention.

In the multiple pressure tube anemometer of the present invention a substantially flat Pitot head basically shaped as two very flat truncated cones joined by a short cylindrical surface at the larger diameter is shown generally at 1. The Pitot head 1 comprises a top plate 2 and a body portion 3 mounted on a shaft 4 which has a threaded mounting portion, not shown. The edge of the Pitot head 1 as well as the body portion thereof is made as narrow as mechanically practical and in the periphery of the Pitot head are disposed four Pitot openings 5 located in quadrature and leading to tubes 6, 7, 8 and 9 in the interior of the body portion 3. Within the body portion 3 there are disposed a plurality of electric heater elements 11 which serve to prevent icing of the Pitot openings in the event of inclement weather. The tubes 6, 7, 8 and 9 extend from the Pitot opening 5 in the head 1 through the shaft 4 to their respective pressure responsive transducer units shown schematically in Figure 3 as operating from diaphragm capsules 12 and 13. The combined outputs of the two transducers are applied through adequate resolving means to a wind direction amplifier 14 and its associated indicator 15 and a wind speed amplifier 16 and its associated indicator 17.

Figure 3 shows a schematic representation of the indicating mechanism of the invention including the pressure responsive devices 12 and 13. Transformer 18 is provided with two secondaries which supply power to two microtorque potentiometers 19 and 21 whose arms 22 and 23 are positioned by the diaphragm capsules 12 and 13. The positions of the arms 22 and 23 determines the amounts of excitation which are applied to stator windings 25 and 26 of a rotary transformer 24 to position a resultant magnetic field in the rotary transformer whose value and position are determined in accordance with the excitation. Windings 27 and 28 on the rotor of the rotary transformer 24 are within the resultant magnetic field and will have induced therein voltages which are proportional to first, the strength of the field, and second, their position with respect to the field. The voltages induced in windings 27 and 28 are applied to conventional electronic amplifiers 14 and 16 respectively. The output of amplifier 14 excites windings 29 of a two phase motor 31 whose other field winding 32 is excited through capacitor 33 from the supply voltage. Motor 31 is mechanically connected to the rotor of rotary transformer 24 and positions the windings 27 and 28 and therewith the wind direction indicator 15.

In the operation of the device of this invention, when the wind strikes against the Pitot head 1 pressures will be developed in the various impact holes 5 such that one pair of opposite impact holes will sustain a pressure differential proportional to the sine of the angle; or, in other words, one pair of Pitot holes will sustain a pressure differential proportional to the cosine of the same angle; or, in other words, one pair of Pitot holes will sustain a pressure differential proportional to the north-south component of the wind while the other set will sustain a pressure differential proportional to the east-west component of the wind. These pressures, when applied to a pair of diaphragm capsules 12 and 13, will adjust the arms 22 and 23 of associated potentiometers 19 and 21 to produce an output from the potentiometers which is proportional to the pressure differential on the capsules. These outputs, when applied to the quadrature stator windings 25 and 26 of the rotary transformer 24, will produce a resultant field in that transformer which will be directionally representative of the wind heading. The rotor of the rotary transformer 24 with the two quadrature windings 27 and 28 mounted thereon is disposed in the resultant field. Winding 28, whose output is applied to a conventional electronic servo amplifier 14, excites one phase 29 of a two phase motor 31; the other phase of the motor 31 being excited from the source through a capacitor 33. The excitation of the motor 31 will cause it to rotate in the proper direction to rotate the rotor of rotary transformer 24 to place the winding 28 in such a position that no voltage will be induced therein at which time winding 29 will no longer be excited and rotation of motor 31 will cease. To the shaft of the rotor of the rotary transformer 24 and to motor 31 is mechanically attached an indicator 15 which moves with the motor and produces the indication of the wind direction.

When the winding 28 is in the null position, the other windings 27 on the rotor of the rotary transformer 24 will be parallel with the resultant field of the windings 25 and 26 and will have induced therein a voltage proportional to the strength of the resultant field. The strength of the resultant field is proportional to the wind velocity. The voltage induced in the winding 27 is applied to a conventional electronic amplifier 16 to which a correction is applied for ambient temperature and pressure in an attenuator 34 and attenuator output is applied to an indicating instrument 28 which is suitably calibrated to give an indication of the wind speed or velocity.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. A stationary, multiple pressure tube Pitot head for measuring wind speed and direction with no moving parts exposed to ambient weather conditions comprising a substantially flat, disc-like shell, a plurality of conduits in said shell terminating in dynamic pressure openings evenly spaced around the peripheral surface of the shell, heaters disposed within said shell, said shell completely enclosing said Pitot head with the exception of said dynamic pressure openings, the flat surfaces of said disk-like shell being in close positional relationship with said heaters and mounting means connected to one of the flat surfaces of said shell and through which said conduits extend, said conduits being substantially co-planar and said heaters being disposed substantially co-planar therewith and intermediate said conduits.

2. A stationary, multiple pressure tube Pitot head providing means for deriving the parameters of a continuously variable wind comprising an enclosing disc-like shell, conduits in said shell terminating in quadraturely spaced dynamic pressure openings in the outer cylindrical periphery of said shell, heaters disposed within said cylindrical shell, the flat surfaces of said disk-like shell being in close positional relationship with said heaters and a hollow supporting member connected centrally to one of the said flat surfaces of said shell and providing means for passing said conduits into said Pitot head, said conduits being substantially co-planar and said heaters being disposed substantially co-planar therewith and intermediate said conduits.

References Cited in the file of this patent

UNITED STATES PATENTS

| 2,270,476 | Rollin | Jan. 20, 1942 |
| 2,343,282 | Daiber | Mar. 7, 1944 |
| 2,404,978 | Morton | July 30, 1946 |

FOREIGN PATENTS

| 164,788 | Great Britain | June 13, 1921 |